United States Patent [19]

Lugtenaar

[11] Patent Number: 5,105,493

[45] Date of Patent: Apr. 21, 1992

[54] FIREFIGHTING TOOL SET

[76] Inventor: Thomas K. Lugtenaar, P.O. Box 44, Manzanita, Oreg. 97130

[21] Appl. No.: 673,234

[22] Filed: Mar. 20, 1991

Related U.S. Application Data

[63] Continuation-in-part of Ser. No. 426,956, Oct. 25, 1989, abandoned, which is a continuation-in-part of Ser. No. 333,645, Apr. 5, 1989, abandoned.

[51] Int. Cl.$^5$ .............................................. A01D 11/00
[52] U.S. Cl. ........................................... 7/116; 7/158; 7/159; 30/308.1; 15/141.1
[58] Field of Search .................... 7/114, 116, 158, 159, 7/170; 30/308.1; 241/168; 15/141.1; 43/137; 29/78-80

[56] References Cited

U.S. PATENT DOCUMENTS

| | | | |
|---|---|---|---|
| 712,942 | 11/1902 | Lawton | 30/308.1 |
| 838,405 | 12/1906 | Henkel | 30/308.1 |
| 1,055,044 | 3/1913 | Hollander | 7/116 |
| 2,830,307 | 4/1958 | Worden | 7/116 |
| 3,473,712 | 10/1969 | Genchi | 7/116 X |
| 3,770,033 | 11/1973 | Gavillet et al. | 81/22 |
| 3,824,641 | 7/1974 | Shandel | 7/116 |
| 4,023,572 | 5/1977 | Weigand et al. | 29/78 X |
| 4,155,149 | 5/1979 | Claesson | 29/78 |
| 4,287,623 | 9/1981 | Tarran | 7/158 |
| 4,700,420 | 10/1987 | Belanger | 7/114 |

FOREIGN PATENT DOCUMENTS 248681  3/1926  United Kingdom ................. 43/137

Primary Examiner—James G. Smith
Attorney, Agent, or Firm—Chernoff, Vilhauer, McClung & Stenzel

[57] ABSTRACT

A set of firefighting tools for use in fighting forest fires and the like in different types of terrain and vegetation. A brightly colored elongate handle of fiber-reinforced synthetic material is equipped with a releasably latching connector, and several different tool heads are attachable to the handle to perform various functions. One head has a pivotably attached shovel blade and is useful as a shovel, as a scraper or as a rake. Also associated with this head is a selectively foldable mixing spoon which may be extended opposite the shovel blade. Another tool head has oppositely directed axe and grub hoe blades and is useful as an axe, a brush hook, or a grub hoe. Yet a further tool head has several flexible straps for beating out fires. An extension member of metal pipe is provided to make the handle useful as a staff when traveling on steep and rough terrain. A backpack includes separate pockets for carrying each of the tool heads individually, as well as other pockets for carrying other items needed by a firefighter walking to the locality of a forest fire or the like.

32 Claims, 8 Drawing Sheets

FIREFIGHTING TOOL SET

This application is a continuation-in-part of copending patent application Ser. No. 07/426,956 filed Oct. 25, 1989, which is a continuation-in-part of patent application Ser. No. 07/333,645 filed Apr. 5, 1989 both now abandoned.

BACKGROUND OF THE INVENTION

The present invention relates to fighting outdoor fires and particularly to a tool set useful for fighting fires in different types of terrain and vegetation.

With increasing movements of U.S. wildfire firemen from one geographic region to another the need for a better firefighting hand tool has evolved.

There are three major wildfire regions in North America. These regions are the east, west, and northern wildfire ecosystems. Each region has its own season, and traditional tools and tactics have evolved in each region. Most firefighters brought to one of these regions from another are not already aware of how different these regions are from each other. Coordinators moving firefighting crews from one region to another are themselves often unaware of these differences.

Wildfire fighters in eastern hardwood areas generally use a fire rake or council tool. In the eastern pine and grass areas of the south a fire beater similar to a rubber mud flap on the end of a wooden pole is often the tool of choice, but such a tool is not well adapted for use in areas where undergrowth or tree branches are close together, because of the width of the tool.

In the west, the Pulaski, shovel, and McLeod are the predominantly used hand tools, and surface vegetable material usually needs to be scraped away to leave a non-flammable fire break.

In the arctic and subarctic ecosystems of Canada and Alaska, burlap bags used as swatters are the main tool in tundra, but they do not last long in use, and spare bags carried by firefighters are hazardous as they often are ignited.

In black spruce taiga ecosystems long knives are needed to cut down black spruce trees and trim them into swatters which are the main initial attack tools, and Pulaskis are the rule for mop-up work. However, spruce trees are not always available, and a great deal of time and energy can be wasted searching for suitable trees, which do not last very long in use, anyway. Additionally, the sharp-edged tool required for cutting such trees can be dangerous to the firefighter.

Particularly in remote or steep terrain it is difficult for a firefighter to have to carry several long-handled tools, such as different types of axes, shovels, rakes, and hoes, to the scene of a fire. Furthermore, it is difficult to keep such tools close at hand for fighting a fire moving through differing types of vegetation and ground cover.

For wildfire fighters to be ready to do their work, they need to have all the necessary tools readily available when they are transported to a fire in any type of terrain likely to encountered in the geographical region where they are to be working. In places where heavy layers of grass roots and the like are found, shovels, grub hoes, and scrapers may not be very useful and fire may have to be beaten down to be extinguished. In other situations trees and brush need to be cut to prevent spreading of fire, and a firefighter may need an axe to be effective. However, cutting small low brush with an axe usually results in quick dulling of the axe blade as it encounters dirt and stones on the ground beneath thin branches.

Once flames have been extinguished the "black line" around a burned area has to be checked to discover, extinguish, and cool embers, to prevent rekindling of the fire. Tools available previously have been intended for specific types of firefighting, but even then are not well adapted to user comfort, requiring users to bend over much or most of the time during use of the previously available tools. This is tiring, resulting in much time needed to rest frequently, and less accomplished than would be possible with tools more comfortable to use.

What is needed, then, is a universal fire tool to arm firefighters so that with this one tool they will be prepared to fight wildfires in any fire-supporting ecosystem and will be more effective, comfortable and indeed safer, under a variety of differing conditions.

One disadvantage of many previously available firefighting tools is that they have been equipped with wooden handles which are too susceptible to breakage during use and loosen because of changing humidity, requiring a great cost in labor and material for replacements. Another disadvantage is that many tools limit firefighters to a single function, so they often do not have the flexibility to respond with the best function to extinguish the fire. For example, in the West, a firefighter equipped with only a normal shovel is committed to a very uncomfortable and inefficient tool for scraping fire line. If a cutting device is needed, such a shovel is incapable. Conversely, a firefighter armed with a Pulaski has a good cutting implement but a poor and uncomfortable scraping device, and the firefighter is unable to throw dirt with a Pulaski to knock down heat. Presently, there is no one effective, durable and user-comfortable tool for all western fires.

Another aspect of many previously available firefighting tools for fighting fires in wilderness is that they are likely to become snagged on vegetation and cause a firefighter to fall, particularly when the fire-fighter is tired and hiking out from the scene of a fire. Particularly when going down steep inclines carrying a shovel, an axe, or a Pulaski, a misstep could result in a fall and serious injury. When a firefighter attempts to break a fall by reaching backward, carried tools may cause cuts, or a fall may result in a broken arm, sprained wrist, bruises, or serious injuries from sharp-edged tools being carried, regardless of edge guards intended to be kept on the tools when they are not in use.

What is needed, then, is a way for a firefighter to carry, and to carry safely, all the tools likely to be needed for effectively fighting a wilderness fire. It should be possible for a firefighter safely to carry the tools necessary to cut trees, branches, and small brush, to dig, scrape, and rake the ground and low-growing vegetation to create a fire line in different types of vegetation and soil, or to beat down flames effectively in grass and low vegetation. It should be possible to perform these tasks all in more comfortable positions and with tools which are safer, stronger, more durable than previously available tools and which include functional options. It should also be possible for such tools to be carried conveniently, so that they are not lost or separated from one another and can be carried away from the fire site safely through steep, rough, and heavily vegetated terrain.

With firefighting crews also being hired for tree planting, and silviculture missions of all types, it is also desirable to have a compatible tool adapted to use in tree planting operations.

SUMMARY OF THE INVENTION

The present invention provides a firefighting tool system which overcomes the aforementioned shortcomings of the previously available firefighting tools and answers the need for a way for an individual firefighter to carry all of the necessary tools safely to fight a forest fire. The firefighting tool system according to the present invention utilizes a single elongate handle of strong, durable material, preferably fire resistant, equipped with a strong, secure, selectively releasable, positively latching, yet quickly operable connector mechanism, for receiving any of three different firefighting tool heads which are all portable safely in a convenient backpack, so that a firefighter can arrive on the scene of a fire with the necessary tools for fighting fires in many different types of flammable vegetation, and in different types of terrain.

More particularly, an important aspect of the invention is the provision of a tool head resembling an enlarged military entrenching tool, which is releasably attachable to the elongate handle by the connector to provide a shovel blade adjustable to different angles for use. The first angle is a main departure from a military entrenching tool. This is an angle of 20°-25° to the length of the handle, established by special ears on the back of the full-sized shovel blade. With this angle between the blade and the handle the shovel is an efficient, long handled, dirt lifting and throwing device, as the pocket of the blade holds the dirt for the perfect release point for accurate and long-range dirt throwing for cooling snags and knocking down hot flareups in order to effectively gain the upper hand on wildfires.

When the blade is adjusted and locked to a 90° angle this tool acts as a comfortable and efficient scraping device. It is a more comfortable scraping tool because it is engineered to be effective when the fire fighter stands erect and not bent over with head down which is typical for most traditional scraping tools. The angle of attack presented by the correct bevel of the shovel blade, the correct balance and weight allow the inertia of the tool to do the work. Each swipe of the tool removes 12 inches of ground cover as opposed to only 3 inches per swipe from a Pulaski, which also commits the firefighter to a very uncomfortable position of use.

Preferably, there are diagonal notches located at intervals along one lateral edge of the shovel blade. These make the blade act as an improvement over a rake for deciduous forests, and the high shovel surface area collects many more leaves and will not permit leaves to spill over the collection surface as do traditional fire council tools for eastern forests. In the West the notches in the shovel blade help break up surface area and aid in slicing through duffs and other difficult ground covers, and root strands.

The shovel head in the perpendicular configuration also serves as an ideal mixing tool for mop-up, when used so that the tip of the shovel blade strikes the ground first instead of the notched side of the blade. This long-handled mop-up tool allows the firefighters to stand upright in the most tiring and long lasting drudgery of mop-up. It is some four times as productive as traditional line-scraping and mop-up tools, and serves as a throwing device and rake as well. The range of options available with the more efficient comfortable and safe shovel, scraper, mop-up attachment make the fire-fighter for the first time more productive, safer and more comfortable.

A further aspect of the present invention is the provision of a combination tool head useful as an axe, a brush hook, or a grub hoe. The combination head is also attachable to the elongate handle by the locking releasable connector, but when detached from the handle it can be carried in a pocket of the backpack where it is safely protected from snagging vegetation and from cutting the firefighter should he fall. The brush hook blade is provided as a concave sharpened edge located in a protected position between the bottom of the axe blade and the handle, so that the axe blade is available for chopping larger branches and tree trunks, while the brush hook can be used to cut smaller branches so that the axe blade edge avoids being dulled by encountering the ground as small branches are cut. This simple three-pound cutting attachment can be fastened securely onto the elongate tool handle of the invention whenever the need arises. This gives the western wildland firefighter a cutting Pulaski-type tool twice as strong as a traditional Pulaski and exposes the firefighter to a dangerous tool only 5-10% of the time rather than a 100% exposure time when equipped with only a Pulaski.

Yet another aspect of the invention is the provision of a fire extinguishing direct contact head including several long narrow straps of tough, flat, flexible material, attached to a handle extension which can be attached to the elongate handle by the connector. The flexible straps of material are heavy enough and wide enough to be swung forcefully to beat down flames by direct contact with the burning materials and thus extinguish fires in low-growing vegetation such as mosses, lichens, and grasses. The tool head including the straps is narrow enough, nevertheless, to be swung effectively in many areas where wide flap-type tools are useful only with great difficulty and little effect. Associated with such a fire extinguishing direct contact head in a preferred embodiment of the invention is a scrubbing device, which can be in the form of a wire brush or, more preferably, a collar of sheet metal extending about the handle and defining numerous radially protruding points at different angles diagonally arranged and useful for scrubbing such materials as moss and lichen during mop-up operations to uncover, cool, and extinguish embers which might otherwise smolder and later rekindle the fire.

An additional feature of the fire extinguishing direct contact device is realized by removing the scrubber device and the strap material. The remaining straight metal pipe serves as the lower end of a walking staff to be used in climbing through rough terrain, as when walking out of mountainous forest after a fire has been extinguished. Use of this staff ensures that edged tools are removed from the handle and are likely to be stowed in the backpack and unlikely to cause injury.

Yet a further attachment useful with the same handle and connector system is a head removably attachable to the handle, and carrying a bracket for receiving various types of blades for opening holes in the ground to receive seedling trees in reforestation, as after logging or where forest fires have occurred.

It is therefore a principal object of the present invention to provide an improved multipurpose set of firefighting tools for use in fighting forest fires and the like in different types of terrain and vegetation and with improved safety.

It is a further object of the present invention to provide a system of interchangeable tool heads adapted to fit a single strong handle, to enable a person to arrive on the scene of a fire equipped to fight the fire effectively, regardless of the type of terrain or vegetation, and to facilitate dropping a set of tools by parachute in a compact package.

It is yet another object of the present invention to provide a set of tools which make it convenient for a firefighter to use a safer tool instead of a sharp-edged tool, at any time when the sharp-edged tool is not required in order to avoid injury.

It is an important feature of the present invention that it provides a universal handle equipped with a strong connector including a permanently attached, releasable latch for releasably attaching a selected one of several different firefighting tool heads to the handle for use in fighting forest fires and the like.

Another important feature of the present invention is the provision of a combination of the capabilities of a shovel, a scraper, a rake, and a mixing tool in a single tool head which is releasably attachable to the handle of the present invention.

Yet a further feature of the present invention is the provision of a multipurpose fire fighting tool head useful as an axe, a brush hook, or a grub hoe when attached selectively to an elongate handle.

The foregoing and other objectives, features and advantages of the present invention will be more readily understood upon consideration of the following detailed description of the invention take in conjunction with the accompanying drawings.

DETAILED DESCRIPTION OF THE INVENTION

Figure 1:
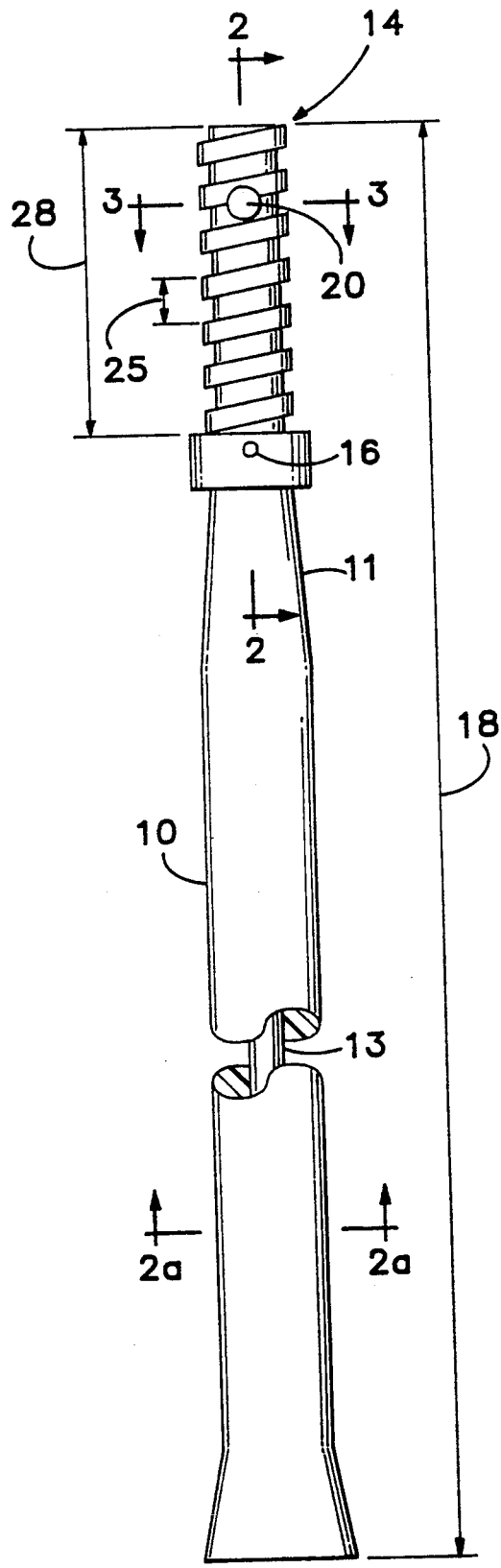
FIG. 1 is a pictorial view of an elongate handle for a firefighting tool incorporating the present invention.
Figure 2:
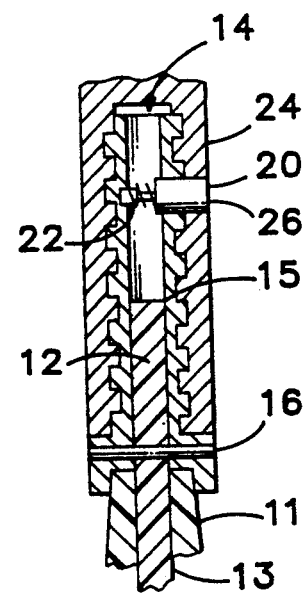
FIG. 2 is a sectional view of a portion of the handle shown in FIG. 1, together with a mating female portion of a releasable latching connector for attaching a tool head to the handle shown in FIG. 1.

Referring now to the drawings which form a part of the disclosure, in FIGS. 1 and 2 an elongate fire-resistant handle 10 includes a main body 11 and a smaller diameter end portion 12. A male threaded connector portion 14 defines a cavity in which the smaller diameter end portion 12 is received. The male threaded connector portion 14 is attached permanently to the end portion 12 by a layer 15 of a suitable adhesive such as an epoxy resin and a fastener such as a rivet 16 extending through both the connector portion 14 and the small diameter end portion 12.

Figure 2A:
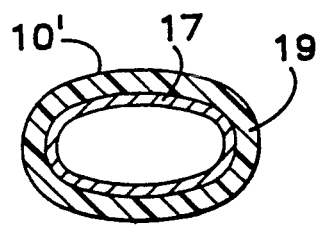
FIG. 2a is a sectional view, taken along line 2a—2a, of another embodiment of the handle shown in FIG. 1.
Figure 3:
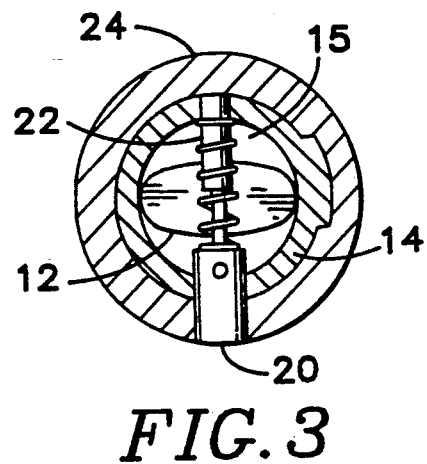
FIG. 3 is an end view taken along the line 3—3, showing the female mating portion of the latching connector shown in FIG. 2.

The main body 11 of the elongate handle preferably is strong and resilient, having, for example, a fiberglass-reinforced resin core 13 extending through its entire length, the core being surrounded by a molded plastic material having an appropriate hardness combined with an appropriate resiliency, to permit the handle 10 to be gripped firmly, without sliding and without transmission of excessive amounts of vibration. A tool handle which can serve as a satisfactory main body 11 for the handle 10 is manufactured by the IXL Group of Bernie, Mo., and is described in greater detail in U.S. Pat. No. 3,770,033, the disclosure of which is incorporated herein by reference. As shown in FIG. 2a, a handle 10' may be in the form of a thin-walled metal tube 17 of a suitable shape, which may be welded to the connector portion 14, and a layer 19 of a cushioning material, molded around and adhering to the tube 17.

The layer 19 may, for example, be a dense closed cell rubberlike foam with enough density and firmness to provide a good grip, but enough resiliency to damp the vibration and shock generated in the tube 17 during use. The tube 17 is preferably of a titanium alloy, to result in a weight reduction of as much as 20%, to reduce fatigue in reaching remote locations where firefighters must walk several miles to reach a fire.

A preferred length 18 of the handle 10, including the length of the male threaded connector portion 14 which forms a portion thereof, is about 35 inches. The handle 10 is preferably brightly colored to be highly visible and thus unlikely to be lost at the site of a fire.

The male threaded connector portion 14 includes a spring-biased plunger 20, located within a cavity defined in the male threaded connector portion 14 and protruding radially from the male threaded connector portion 14 under the influence of the compression spring 22. The plunger 20 serves as a detent to retain the male threaded connector portion 14 in a fully mated position with respect to a female threaded connector portion 24 by extending outwardly through a corresponding bore 26 defined in the female connector portion.

Preferably, the male and female connector portions 14 and 24 define mating coarse helical threads such as a modified Acme thread having a pitch 25 of at least ¼ inch, preferably approximately ½ inch, and a radial thread depth of at least about 1/16 inch. The threaded connector portions 14 and 24 can thus be mated and separated with a relatively small number of turns of the screw threaded portions, yet the length 28 of the mated portions of the male and female threaded portions 14 and 24 is great enough for the connector to carry the loads to which it will be subjected during use of the tool of the invention.

As may be seen in FIGS. 4, 5, 6 and 6a, a shovel head 30 attachable to the handle 10 includes an elongate handle extension 32, preferably of aluminum pipe welded to a female connector portion 24. The handle extension has a length 34 of about 14 inches, between a female threaded connector portion 24 and a pivot axis 40 extending transversely of the handle extension 32. A shovel blade 42 is connected pivotably to the handle extension 32 by a pair of parallel ears 44 extending from a mounting plate 46 fastened to the shovel blade 42 by fasteners such as rivets 48. The ears 44 extend parallel with one another on opposite sides of a bar 50, part of the handle extension 32, and a fastener such as a rivet 52 extends along the pivot axis 40, through respective bores defined in each of the ears 44 and the bar 50.

Figure 4:
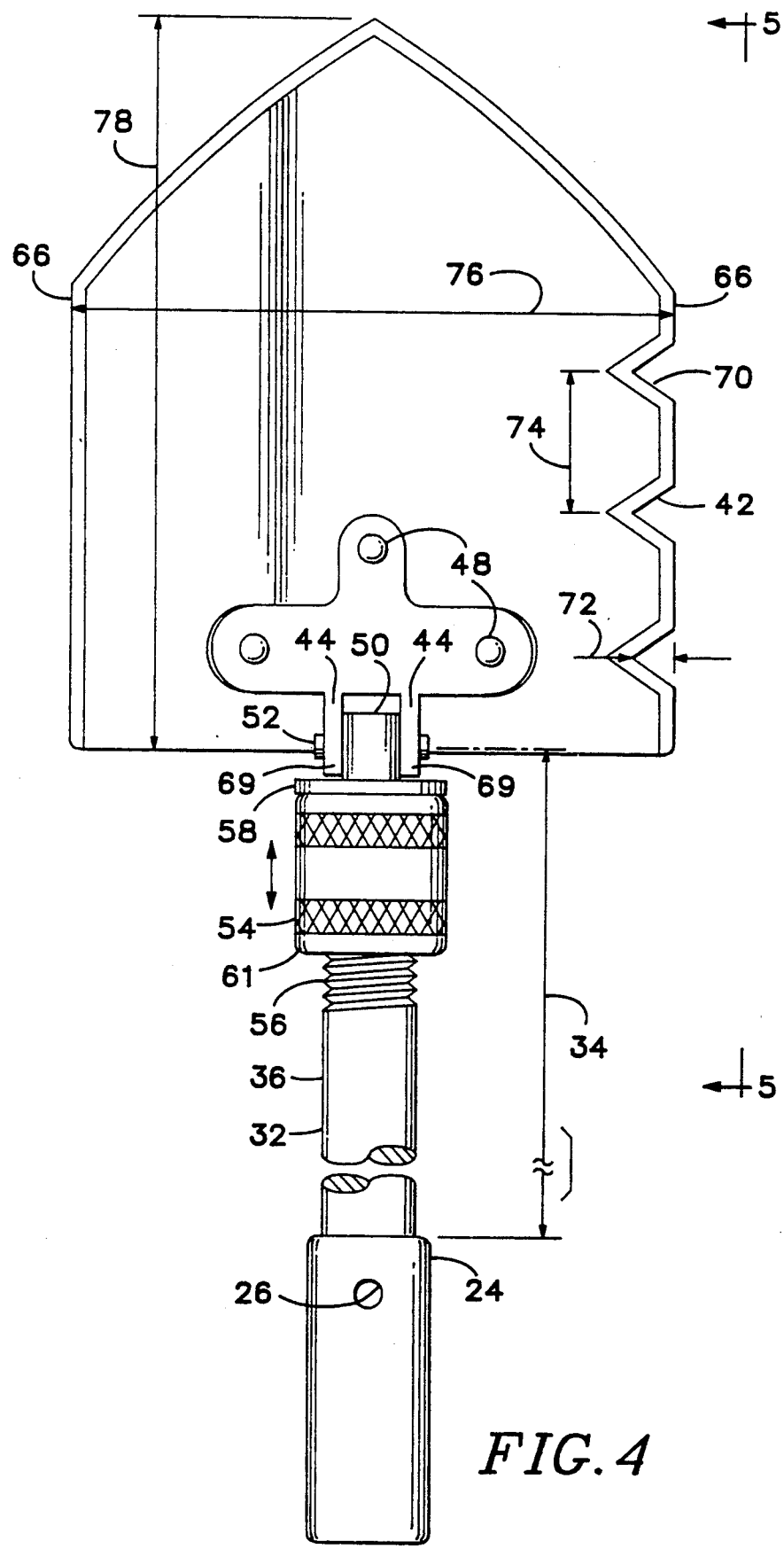
FIG. 4 is a view of a shovel blade head which is attachable to the handle shown in FIG. 1 using the latching connector shown in FIG. 2.
Figure 5:
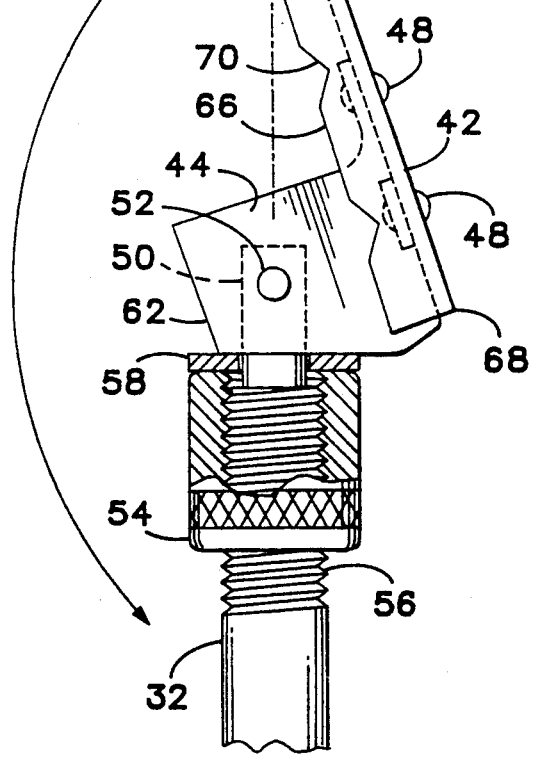
FIG. 5 is a sectional side view, taken along the line 5—5, of a portion of the shovel blade head shown in FIG. 4.
Figure 6A:
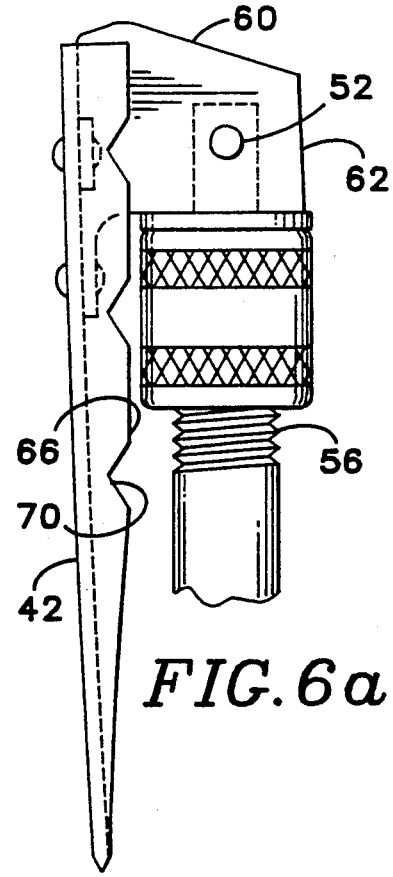
FIG. 6a is a view similar to that of FIG. 6, showing the shovel blade in storage or non-use position against the handle extension.

The shovel blade 42 can be rotated with respect to the handle extension 32, except when it is held in a particular position by a retainer collar 54, which is mounted in threaded engagement with an exterior thread 56 on the handle extension 32. A heavy washer 58 is slidable along the bar 50 between the retainer collar 54 and the ears 44, so that when the retainer collar 54 urges the washer 58 into contact with the flat faces 60, 62, or 64 of the ears 44 the shovel blade 42 is prevented from pivoting about the pivot axis 40 with respect to the handle extension 32. Thus, the shovel blade can be held in a first, or shovel, position extending in line with and away from the handle extension 32 as shown in FIGS. 4 and 5, when the washer 58 is held against the flat surfaces 60 by the retainer collar 54. In this position of the shovel blade 42, a pair of lateral edges 66 of the shovel blade 42 which are parallel with each other and perpendicular to a rear edge 68 of the shovel blade 42, are generally inclined with respect to an imaginary extension of the handle extension 32, at an angle 57 of approximately 20°-25°, as shown in FIG. 5.

Figure 6:
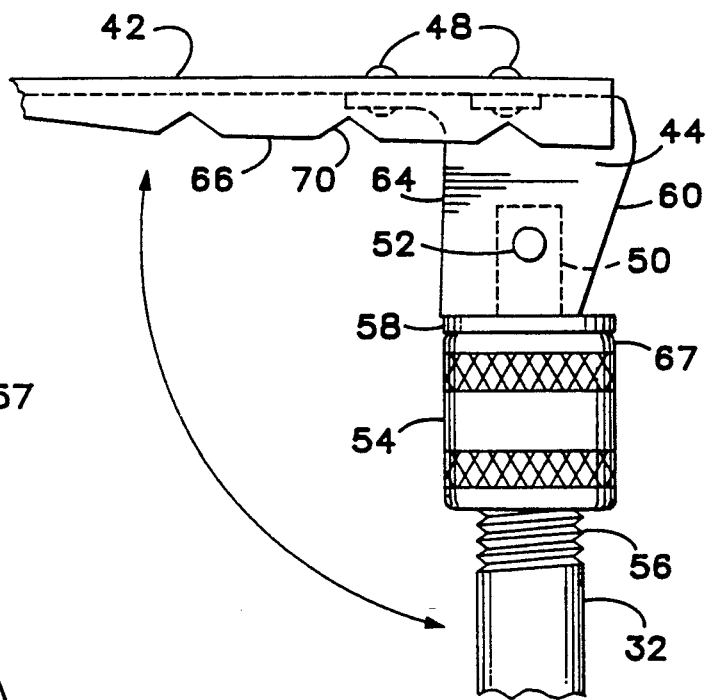
FIG. 6 is a view similar to that of FIG. 5, showing the shovel blade held in a scraping and mixing position perpendicular to the handle extension portion of the shovel blade head shown in FIG. 4.

As shown in FIG. 6, when the retainer collar 54 holds the washer 58 in a position in contact with the flat faces 62 of the ears 44, the shovel blade 42 and its lateral edges 66 extend substantially perpendicular to the handle extension 32. With the shovel blade 42 thus extending laterally, the shovel blade is useable as a scraper or rake, with teeth separated by notches 70 defined in at least one of the lateral edges 66. In one embodiment of the tool each of the notches has a depth 72 of about 1 inch and a width of about 1 inch, while the notches are separated from one another by a notch interval 74 of about 2 inches, and the lateral edge 66 and the notches are sharpened to assist in cutting and scraping vegetation. Preferably, the notches 70 are on the side of the blade where the connector threads will be tightened by the forces of using the shovel blade 42 as a rake.

In a preferred embodiment of the invention the shovel blade 42 has a width 76 of about 8½ inches, and a length 78 of about 11 inches. The width gives the shovel blade 42 a better ability than a conventional rake to move loose leaves and similar materials.

The shovel blade 42 can be rotated between the shovel position shown in FIG. 5 and the scraper or rake position shown in FIG. 6 when the collar 54 is unscrewed along the thread 56 away from the ears 44. Additionally, the shovel blade 42 can be folded further, as indicated by the arrow in FIG. 6, to place the shovel blade 42 alongside the handle extension 32, with the lateral edges 66 of the blade parallel with the handle extension 32, to reduce the overall length of the shovel blade head 30 for greater convenience in carrying it when it is not being used.

Figure 7:
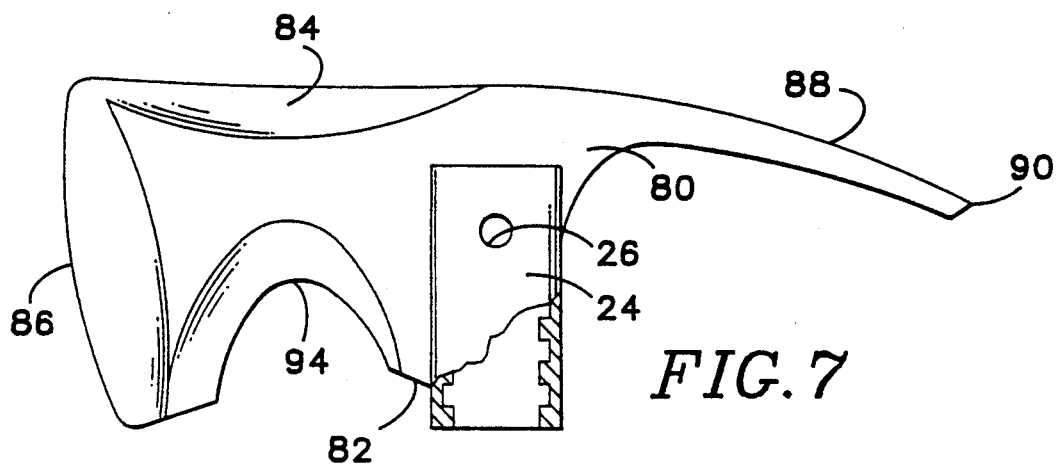
FIG. 7 is a side view of a combination head which is attachable to the elongate handle shown in FIG. 1.
Figure 8:
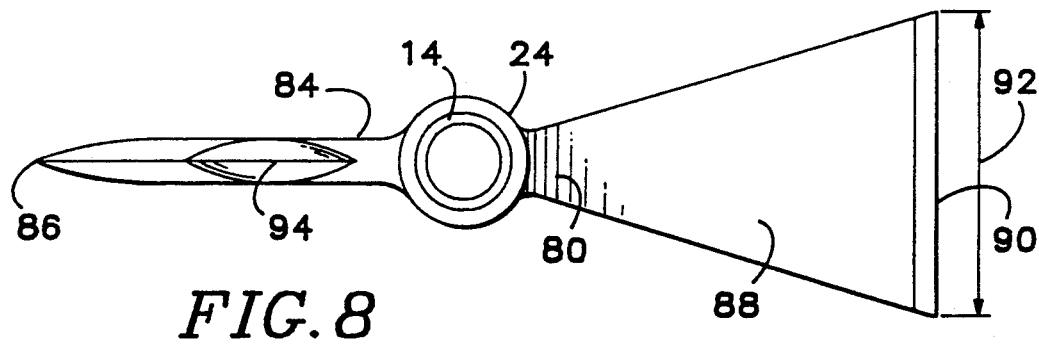
FIG. 8 is a bottom view of the combination head shown in FIG. 7.

A cutting combination head 80, shown in FIGS. 7 and 8, has a bottom 82 to which a female connector portion 24 is attached fixedly, as by welding. The combination head 80, like the shovel head 30 can be attached removably to the elongate handle 10 by means of the female connector portion 24.

The cutting combination head 80 includes an axe blade portion 84 having a sharpened edge 86 which extends in the same plane with and generally parallel with the female connector portion 24. The edge 86 is directed away from the female connector portion 24, and is best used for chopping larger materials such as tree limbs and large roots. Extending in the opposite direction from the axe blade portion 84 is a grub hoe blade portion 88. The grub hoe blade 88 lies generally in a plane perpendicular to the length of the female connector section 24 and has a sharpened edge 90 which lies in the same plane with and extends generally perpendicular to the length of the female connector 24 and the handle 10. As may be seen in FIG. 8, the grub hoe blade portion 88 has a width 92, which, in a preferred embodiment of the invention, is approximately 3 inches. The grub hoe is best used for trenching, grubbing rocks and dirt away from roots, and clearing tough ground cover down to mineral soil.

Lying substantially in the same plane as the edge 86 of the axe blade portion 84, and located on the bottom 82 of the axe blade portion 84, is a sharpened brush hook edge 94 in the shape of a concave curve. The brush hook edge 94 is exposed downwardly along the handle 10 when the combination head 80 is attached to the handle 10 with the threaded connector portions 14 and 24 mated. As a result, branches and brush can be cut by being hooked with the sharpened brush hook edge 94 and then pulling the handle 10 during use of the combination head 80. Thus, the combination head 80 ca be used as an axe, making use of its sharpened edge 86, or as a grub hoe, making use of its grub hoe blade 88, and additionally may be used as a brush hook by using the brush hook edge 94 to cut small branches and thus avoid the dulling of the sharpened edge 86 of the axe blade 84 which ordinarily would result from cutting into small branches and sticks lying on the ground with sharpened edge 86 of the axe blade.

Figures 9, 10, 11, 12:
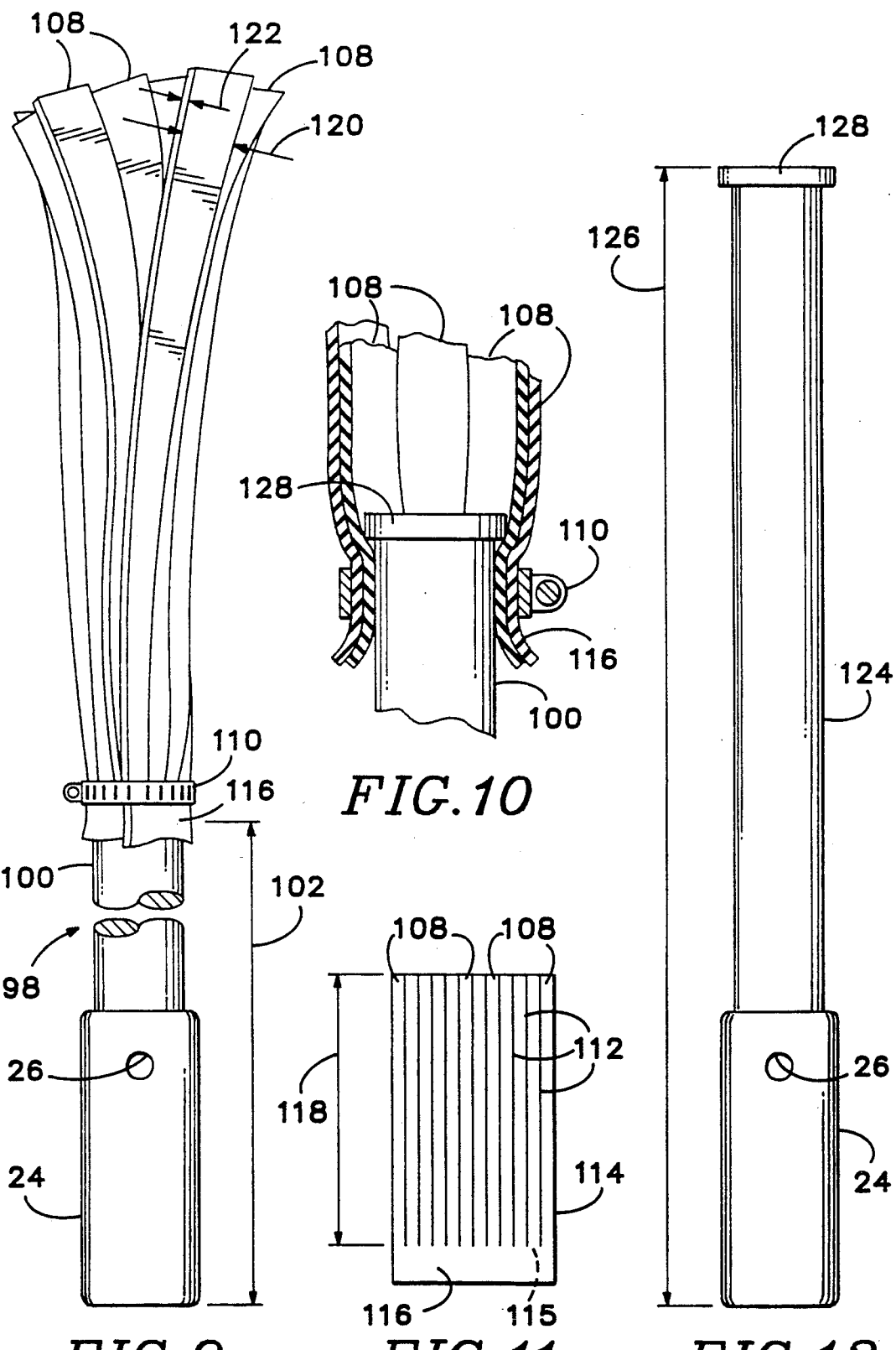
FIG. 9 is a view of a fire extinguishing, direct contact, or fire beater, head which is attachable to the elongate handle shown in FIG. 1.
FIG. 10 is a sectional view of a portion of the fire extinguishing, direct contact head shown in FIG. 9, showing the method of attachment of beater straps to the head.
FIG. 11 is a view of a sheet of material defining straps used in the fire extinguishing, direct contact head.
FIG. 12 is a view of an elongate staff extension head which is attachable to the elongate handle shown in FIG. 1.

A fire extinguishing direct contact head 98, or fire beater, shown in FIG. 9 includes a female connector portion 24 and a handle extension portion 100 which together have a length 102 of about 19 inches, in a preferred embodiment of the invention. A flared larger-diameter terminal portion 128 of handle extension 100 (FIG. 10) serves as a safety stop or lock feature. A plurality of narrow elongate flat sheet straps 108 of flexible material are fastened to the terminal portion of the handle extension 100 by a clamp 110. For example, after the flexible material is rolled onto the end of the handle extension, a hose clamp 110 is placed so as to encircle the flexible material behind flared terminal portion 128, and is tightened to form the fire extinguishing direct contact, or fire beater, head 98.

Preferably, as shown in FIG. 11, the straps 108 are formed by parallel cuts 112 defined in a sheet 114 of fabric-reinforced synthetic rubber, such as a three-ply fabric-reinforced neoprene flat belt material. Such material is durable enough and fire-resistant enough to be used for several days' work of beating out fires in grass-roots, moss, lichens, tundra vegetation, or other vegetation which is too tough to be scraped away efficiently in fighting wildfire. Preferably, the cuts 112 extend to an imaginary line 115 defining a marginal header portion 116 about 2 inches wide. Each of the straps 108 has a length 118 which is preferably about 22-24 inches, leaving the marginal header portion 116 to be wrapped around the end portion of the handle extension 100 behind the flared terminal portion 128. While the straps 108 would be functional with a length as short as 16 inches, a greater length performs better and allows for some gradual loss of length during use. Greater length allows the straps to wrap about and conform better to the shape of burning material to exclude air and extinguish the fire. It has been found that the beater head performs well and can be used while standing in a relatively comfortable posture when each of the straps 108 has a width 120 of at least about 1 inch and preferably about 1½ inch and a thickness 122 of about ⅛ inch, and the length of the fire beater, including the handle 10, is at least about 6 feet.

Removal of the strap material and scrubber device leaves a staff extension 124, shown in FIG. 12, which includes a female connector portion 24, and preferably has an overall length 126 of about 19 inches, including the length of the female connector portion 24, so that when the staff extension 124 is mated with the elongate handle 10 a staff of at least 4 feet and preferably 4½ feet in overall length is created. The staff extension 124, beyond the female connector portion 24, is preferably of lightweight, high strength metal pipe, such as aluminum pipe which is very strong for its weight and able to withstand the rigors of use as the working end of a staff to support a firefighter's weight as he leans on the staff to maintain or regain balance lost by slipping during work on steep terrain. Preferably, a plug closes the bottom end of the staff extension 124 at terminal portion 128. The staff created by attachment of the staff extension member 124 to the handle 10 may be used by a person walking down a steep hill, for example, by holding it extending rearwardly and downwardly behind him. The person can lean back on the staff to gain its support and thus avoid a fall, or to obtain the benefit of additional drag to avoid going downhill too fast. It is also useful to locate deep holes and as a support, when crossing rivers.

As an alternative embodiment of the staff extension member 124, a portion of its side surfaces near its bottom end can be provided with indentations and surface roughening so as to provide a satisfactory seat for the sheet 114, defining straps 108 of the fire beater head 98, to be attached to the staff extension member 124. The sheet 114 can then be attached to the staff extension 124 by a clamp similar to the clamp 110.

Figure 13:
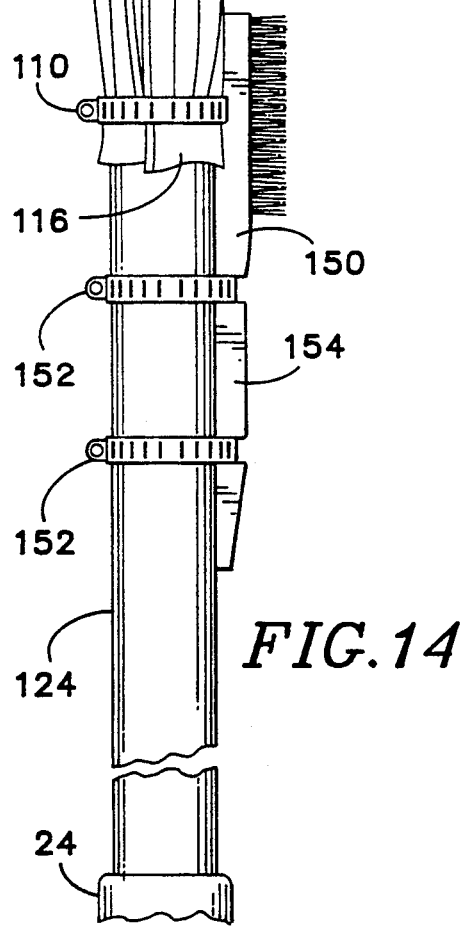
FIG. 13 is a pictorial view of a backpack including separate pockets designed, respectively, to carry a shovel blade head, a beater and safety staff head, and a cutting head of a firefighting tool according to the present invention.

Referring next to FIG. 13, a backpack 130 preferably of bright colored fabric with a waterproof or water repellent surface, includes a special pocket 132, for holding the shovel blade head 30, and a special pocket 134 for holding the combination head 80. Both of the pockets 132, 134 are lined with heavy sheet plastic material, such as a 1/16" thick layer of plastic riveted to the fabric of the backpack. Each pocket is provided with Velcro closure fasteners. Storage is thus provided in the backpack 130 for all of the interchangeable heads attachable to the handle 10, so that a firefighter has available each of the different types of firefighting tool heads provided by the present invention, with each of the sharp edged heads held in a safe position out of the way of being caught during movement through a brush-covered or otherwise heavily vegetated region on foot. Blade edges are thus protected without dangerous edge guards having to be fitted. Clothing carried in the main storage compartment 140 will act as padding to protect the user from being bruised by falling back onto the backpack while the tool heads are being carried. All of the tool heads are carried to and from a fire in such a backpack by ground personnel, or may be dropped to a parachute landing site for use by smokejumpers after they are on the ground. As a result, regardless of the type of terrain or of the vegetation which has become fuel for a fire, the firefighter equipped with the interchangeable tool heads and the handle 10 according to the invention is equipped to fight the fire. Finally, pocket 141 carries a standard fire shelter.

Figure 14:
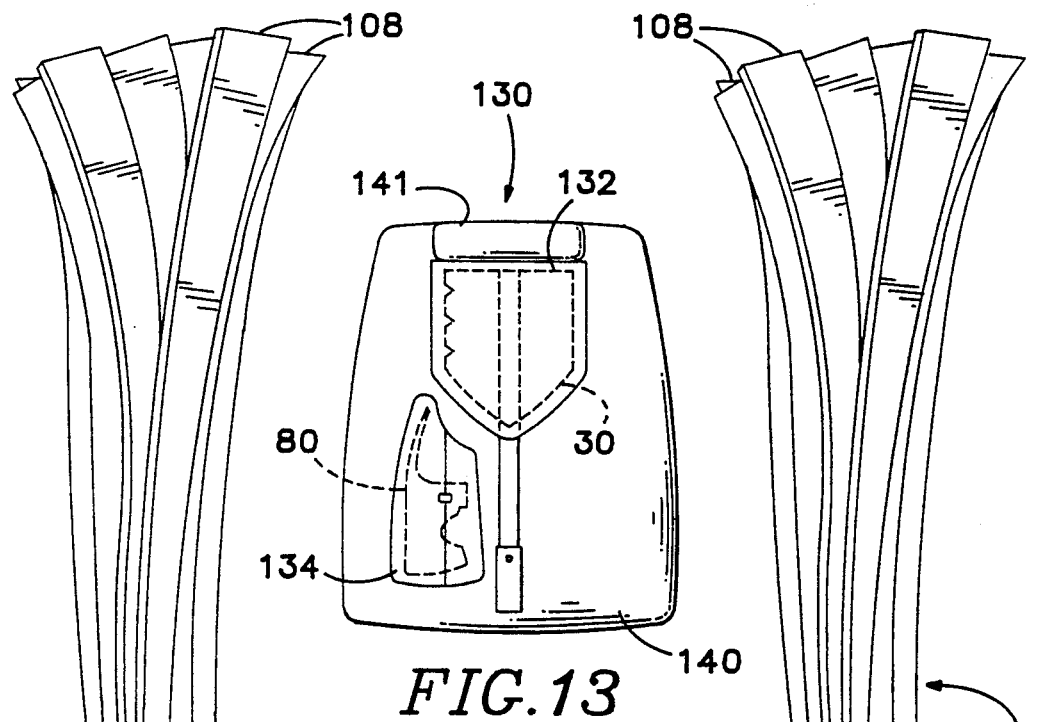
FIG. 14 is a view of the fire extinguishing direct contact head of the invention with an attached scrubber for uncovering embers.

In FIG. 14, a scrubber, such as a wire brush 150 is shown attached to the fire beater attachment by two hose clamps 152 encircling the handle of the wire brush and of the fire extinguishing direct contact attachment 98. One of the main problems with arctic taiga fire is that after the flames are beaten out, sparks often survive, hidden and smoldering deep in the moss. These often survive until the next day. On extensive fire perimeters a small number of initial attack fire fighters will have trouble holding the fire when those smoldering hot spots want to turn again into open flame.

However, by simply dragging the scrubber along the edge of the black line (where the burned moss and unburned mosses meet), those hiding pockets of smoldering heat will be torn open by the wire brush 150 and exposed to cooling. Areas left unbrushed will often erupt back into open flame when humidities drop and winds rise. This is a major change in tactics for taiga fires. It is usually not necessary for tundra or temperate grasslands. Tundra on dry ridgetops will need to be black-line dragged; however, tundra in low lands usually does not need this unless unusually drought stricken.

Figure 15:
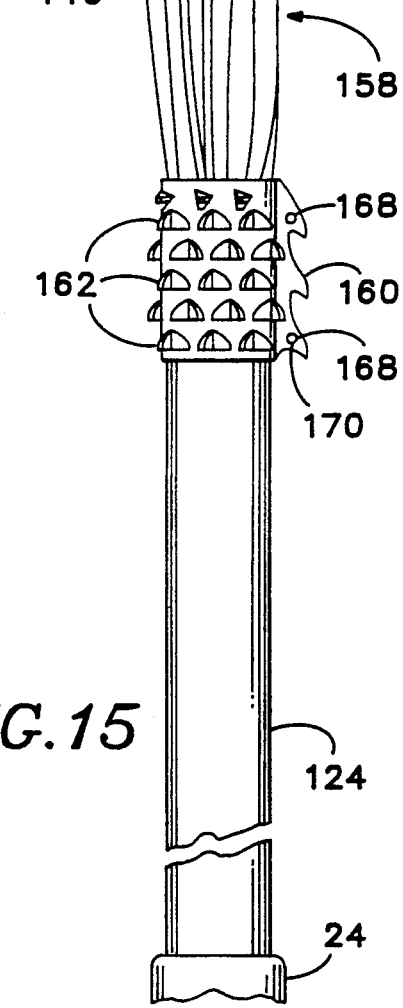
FIG. 15 is a view of another embodiment of the fire beater head according to the invention, equipped with a collar-like scrubber for uncovering embers.
Figure 16:
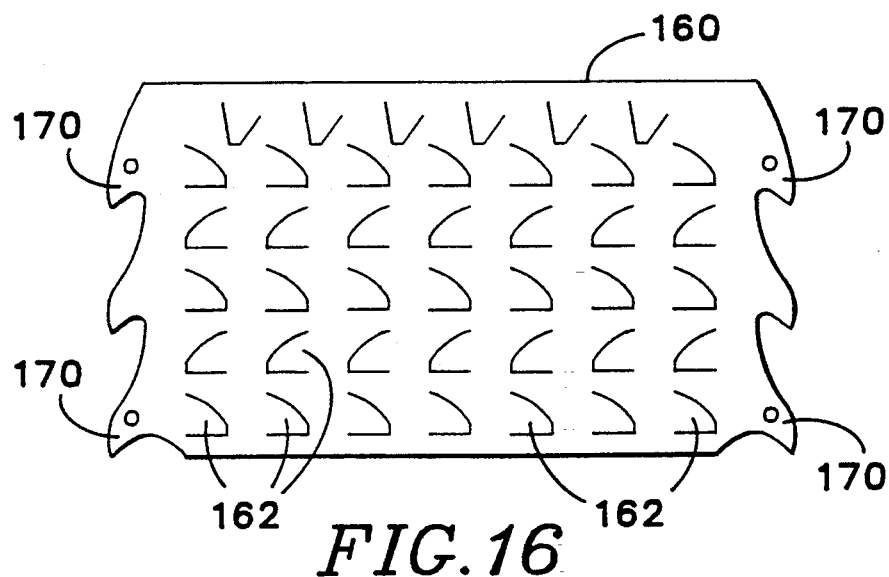
FIG. 16 is a view of a pattern for a scrubber collar of sheet metal such as the one shown together with a fire beater in FIG. 15.

FIGS. 15 and 16 show a fire extinguishing direct contact or fire beater head 158 which is a further refinement of the invention, and in which a sheet metal collar 160 has been formed, as by die-stamping, to provide a pattern of many radially outwardly protruding, diagonally arranged, dull triangular teeth 162 each having a pair of diverging edges 164. The collar 160 is securely attached to the fire beater head, preferably at the end of the handle extension portion 100 and near the convergent root portions of the several flexible straps 108. The all-around distribution of scrubbing teeth gives the firefighter a tool which is effective in crevices between closely spaced grass tussocks, and in other narrow places and holes. Triangular teeth 162 are preferably about ⅛ inch long and the generally triangular shape of each tooth 162 resists clogging by the moss or lichen being scraped apart to uncover embers. The collar 160 may be attached, as shown in FIG. 16, by the use of a pair of clamping bolts 168 extending through respective ears 170 formed as a part of the sheet metal structure of the collar. The collar 160 may be used in a fashion similar to the use of the wire brush 150, as described previously, but with the added advantage that the fire extinguishing direct contact head 158 need not be rotated to a particular orientation to be used to scrub moss or lichen after beating flames down, and with the further advantage that the numerous points 162 defined in the sheet metal collar 160 are now arranged in a 360° configuration ensuring a greater range and ease of scouring all areas of blackline in holes, crevices, sides of tussocks, etc.

The scrubber device 160 is also designed to be used alone and independent of the fire extinguishing, direct contact strap material, for coldtrailing mop-up operation. One of the traditional problems in arctic and tropic wildfire is that after initial attack (efforts at knocking out open flame) the entire perimeter of extensive fires which could be as large as one million acres must be constantly and repeatedly coldtrailed. This is a perimeter search by ground crews for tiny smokes and smoldering embers inside the fire. In areas where no line separates burned from unburned fuels, ground crews are expected to feel all suspected areas by hand touch for heat. Since perimeters are so extensive, every square inch of perimeter cannot practically be physically felt by bare, naked hands. Often, days and weeks after ground crews have walked past areas of the perimeter that appeared cold and totally out, surviving embers erupt into flame and evolve into what are called "reburns." If extensive mop-up conditions in arctic or tropic areas are encountered with no imminent flame, ground crews can employ this device mounted on staffs such as elongate handles 10 combined with extension members 124 devoid of straps 108. By mounting scrubbers such as the collar 160 on 6-foot-long trimmed trees, ground crews can drag these scrubbers along the blackline to tear open and change things to better expose hot spots and find the problem places that formerly were only looked at visually and randomly felt by hand.

Figure 18:
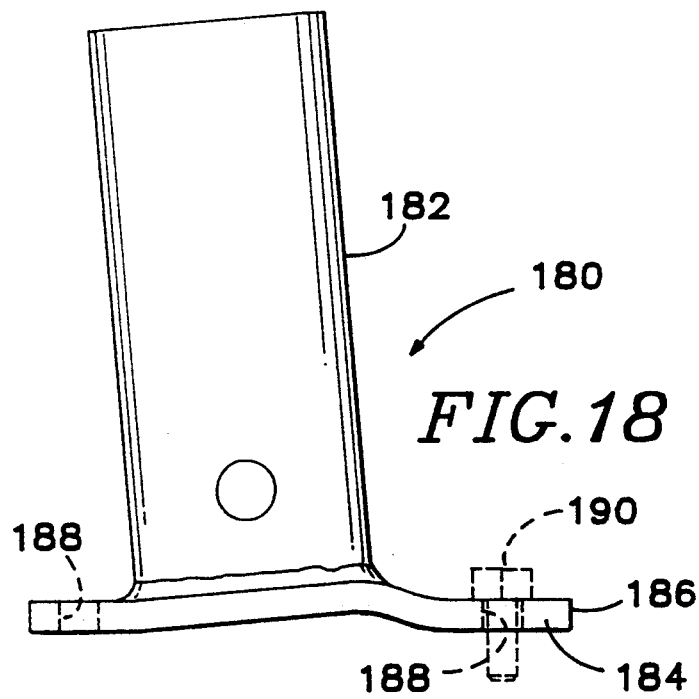
FIG. 18 is a side view of the mounting bracket for tree planting blades shown in FIG. 17.
Figure 17:
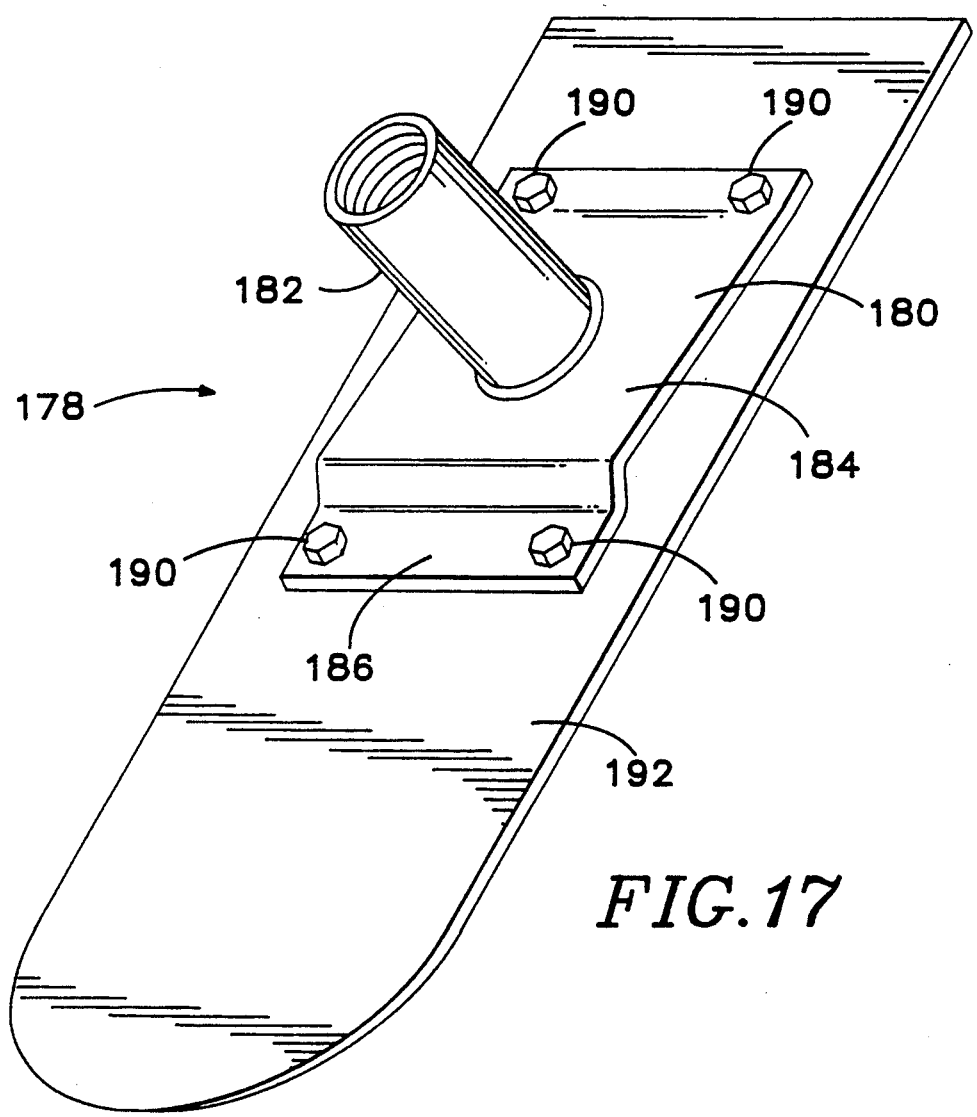
FIG. 17 is a perspective view of a tree planting head including a mounting bracket adapted for releasable connection to the handle of the universal firefighting tool set according to the present invention.

Referring now to FIGS. 17 and 18, a tree planting head 178 includes a bracket 180 equipped with a female connector 182 similar to the female connectors 24 used in each of the firefighting tool heads described previously. The bracket 180 includes a plate 184 having an end portion 186 directed at an angle to the remainder of the plate, and bolt holes 188 and bolts 190 are provided on the plate 184 for attaching a hole-making blade 192 to the bracket securely, but replaceably, with the female connector extending away from the blade 192 at a preferred angle. With this head 178 attached to the handle 10 by the male threaded connector portion 14 being mated with the female connector portion 182, the tree planting blade 192 can easily be swung in the desired manner for making holes to receive seedlings. At the same time, because of the greater strength of the handle, by comparison with the traditional wooden handles used in the past for tree-planting "hoedads", the device of the present invention is much sturdier and more durable.

To accommodate use in different terrain, or to replace worn-out or dull blades with a minimum of effort, the bracket 180 will accept various different blades in place of the blade 192 shown herein, each best adapted to a particular geology where planting is to be carried out.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A firefighting tool comprising:
 (a) an elongate handle;
 (b) a plurality of different interchangeable heads, including a cutting head and a fire beater head;
 (c) said fire beater head including a handle extension having a terminal portion and a plurality of elongate flexible straps of sheet material, each having a length of at least about sixteen inches, each of said straps having a first end, and said first ends being connected together to said terminal portion of said handle extension; and
 (d) selectively releasable connector means for attaching a selected one of said heads to said elongate handle, said connector means including mating helically threaded portions located respectively on said elongate handle and said one of said heads and selectively releasable latching means associated with said elongate handle and said one of said heads for preventing inadvertent loosening of said connector means by preventing rotation of said threaded portions relative to one another when said threaded portions are fully mated with one another, said latching means being free of parts which must be separated from both of said elongate handle and said selected one of said heads to effect release of said latching means and thereby permit rotation of said threaded portions relative to one another.

2. The firefighting tool of claim 1, said latching means including a plunger and defining means for receiving said plunger in a latched condition of said connector means and including resilient means for biasing said plunger toward said latched condition.

3. A firefighting tool, comprising:
 (a) an elongate handle;
 (b) a combination head including an axe-like edge and an oppositely directed grub hoe blade; and
 (c) selectively releasable connector means for attaching said combination head to said handle, said connector means including mating helically threaded portions located respectively on said elongate handle and said combination head and selectively releasable latching means for preventing inadvertent loosening of said connector means by preventing rotation of said threaded portions relative to one another when said threaded portions are fully mated with one another, said latching means including a plunger and defining means for receiving said plunger in a latched condition of said connector means and including resilient means for biasing said plunger toward said latched condition.

4. The firefighting tool of claim 3 wherein said handle is constructed of fiber-reinforced synthetic material.

5. The firefighting tool of claim 3 wherein said handle is of a bright highly visible color.

6. The tool of claim 3, further including a shovel head including a shovel blade, said shovel head being interchangeably attachable to said elongate handle by said connection means in place of said combination head.

7. The tool of claim 6 wherein said shovel blade defines a rear edge and has a pair of opposite lateral edges extending generally parallel with one another and generally perpendicular to said rear edge, at least one of said lateral edges defining a plurality of notches therein, said notches each having a depth of about 1 inch and being separated from one another by a distance at least about equal to said depth.

8. The firefighting tool of claim 3, further including a fire extinguishing direct contact head interchangeably attachable to said elongate handle by said connection means in place of said combination head.

9. The firefighting tool of claim 8 wherein said fire extinguishing direct contact head includes a handle extension having a terminal portion, and a plurality of elongate flexible straps, a first end of each of said straps being attached to said handle extension proximate said terminal portion thereof.

10. The firefighting tool of claim 9 wherein said flexible straps are selectively removable from said handle extension and said handle extension is thereafter serviceable as a rigid elongate staff extension and said terminal portion thereof is flared to serve as brake means for helping to avoid slipping and falling on slippery terrain.

11. The firefighting tool of claim 10 wherein said staff extension is of lightweight high strength metal pipe construction.

12. The firefighting tool of claim 10 wherein said combination of elongate handle and said staff extension attached to said elongate handle by said connector means has a total length of at least about 4 feet.

13. The firefighting tool of claim 3 wherein said helically threaded portions define a coarse thread having a pitch of at least about ¼ inch.

14. A firefighting tool, comprising:
 (a) an elongate handle;
 (b) a combination head including an axe-like edge and an oppositely directed grub hoe blade;
 (c) selectively releasable connector means for attaching said combination head to said handle, said connector means including selectively releasable latching means for preventing inadvertent loosening of said connector means, said latching means including a plunger and defining means for receiving said plunger in a latched condition of said connector means and including resilient means for biasing said plunger toward said latched condition; and
 (d) a shovel including a shovel blade, said shovel head being interchangeably attachable to said elongate handle by said connector means in place of said combination head, and said shovel blade defining a rear edge and having a pair of opposite lateral edges extending generally parallel with one another and generally perpendicular to said rear edge, at least one of said lateral edges defining a plurality of notches therein, said notches each having a depth and being separated from one another by a distance at least about equal to said depth, and said shovel head also including an elongate handle extension and attachment means defining a pivot axis extending transversely with respect to the length of said handle extension and generally parallel with said rear edge of said shovel blade, for releasably holding said shovel blade in a selected one of a shovel position, in which said blade extends away from said handle extension and said lateral edges extend generally at an angle in the range of about 20°-25° with respect to an imaginary extension of said handle extension, and a scraper position, in which said lateral edges extend substantially perpendicular to said handle extension, said shovel blade being pivotable about said pivot axis between said shovel position and said scraper position.

15. The firefighting tool of claim 14 wherein said shovel blade is pivotable further about said pivot axis from said scraper position to a third position in which said shovel blade extends alongside a portion of said handle extension and said lateral edges extend substantially parallel with said handle extension.

16. The firefighting tool of claim 14, said axe-like edge being included in an axe blade portion of said combination head, said combination head further including a sharpened concavely arcuate brush hook edge located on said bottom of said axe blade, said brush hook edge extending generally away from said handle and being located substantially in a plane including said handle and said axe-like edge of said axe blade.

17. A firefighting tool, comprising:
 (a) an elongate handle;
 (b) a combination head attached to an end of said elongate handle, said combination head including
  (i) an axe blade portion having a bottom and extending in a first direction and having a convexly arcuate sharpened axe edge directed away from and extending generally parallel with said handle;
  (ii) a grub hoe blade extending oppositely from said first direction and having a sharpened grub edge located in a plane substantially perpendicular to the length of said handle, said grub edge extending generally perpendicular to said axe edge; and
  (iii) a sharpened concavely arcuate brush hook edge located on said bottom of said axe blade, said brush hook edge extending generally away from said handle and being located substantially in a plane including said handle and said sharpened edge of said axe blade; and
 (c) connector means for attaching said combination head to said handle, said connector means including mating helically threaded portions on said elongate handle and said combination head and selectively releasable latching means for preventing inadvertent loosening of said connector means by preventing rotation of said threaded portions relative to one another when said threaded portions are fully mated with one another, said latching means including a plunger and defining means for receiving said plunger in a latched condition of said connector means and including resilient means for biasing said plunger toward said latched condition.

18. A firefighting tool, comprising:

(a) an elongate handle having a pair of opposite ends and a terminal portion adjacent one of said ends; and (b) a fire extinguishing direct contact head including a plurality of elongate flexible straps of multi-layer fabric impregnated with rubber-like material each having a width of at least about 1 inch and a length of at least about 16 inches, said straps extending in generally parallel fashion from a marginal header portion, a first end of each of said straps being attached to said terminal portion by said header portion being wrapped around and clamped to said terminal portion.

19. The firefighting tool of claim 18, further including scrubber means having a plurality of outwardly projecting points for exposing, spreading, and cooling embers, wherein said handle includes a main body and said terminal portion of said handle has an end and includes an enlarged diameter portion serving as a stop portion located adjacent said end of said terminal portion, said header portion being wrapped around said terminal portion between said stop portion and said main body of said handle and held in place by said scrubber acting as a clamp.

20. A firefighting tool, comprising:
(a) an elongate handle having a length;
(b) a shovel blade defining a rear edge and having a pair of opposite lateral edges, at least one of said lateral edges defining a plurality of generally V-shaped notches spaced apart from one another along a major portion thereof to define rake teeth; and
(c) shovel blade attachment means defining a pivot axis extending transversely with respect to the length of said handle and generally parallel with said rear edge of said shovel blade, for releasably holding said shovel blade in a selected one of a first position in which said shovel blade extends away from said handle and said lateral edges extend generally at an angle in the range of about 20°-25° with respect to an imaginary extension of said handle, and a second position in which said lateral edges extend substantially perpendicular to said handle, said shovel blade being pivotable about said pivot axis between said first and second positions.

21. The firefighting tool of claim 20, further including separable connector means for detachably connecting said shovel blade to said elongate handle, and further including a cutting head selectively attachable to said elongate handle by said connector means.

22. A firefighting tool kit for use by forest firefighters, comprising:
(a) an elongate handle;
(b) a combination head including an axe-like edge and an oppositely directed grub hoe blade;
(c) selectively releasable connector means for attaching said combination head to said elongate handle said connector means including mating helically threaded portions on said elongate handle and said combination head and selectively releasable latching means for preventing unintended loosening of said connector means by preventing rotation of said threaded portions relative to one another when said threaded portions are fully mated with one another, said latching means including a plunger and defining means for receiving said plunger in a latched condition of said connector means and including resilient means for biasing said plunger toward said latched condition and means for retaining said plunger always attached to one of said elongate handle and said combination head;

(d) a shovel head interchangeably attachable to said elongate handle by said connector means in place of said combination head;

(e) a fire extinguishing, direct contact head interchangeably attachable to said elongate handle by said connector means in place of said combination head; and (f) a backpack including a plurality of separate pockets for holding, respectively, said combination head, said shovel blade head, and said beater head.

23. A firefighting tool, comprising:
(a) an elongate handle having a pair of opposite ends and a terminal portion adjacent one of said ends;
(b) a fire extinguishing direct contact head including a plurality of elongate flexible straps of sheet material each having a length of at least about 16 inches, said straps being defined by a plurality of separate generally parallel cuts in a sheet of material having a marginal portion, at least a majority of said plurality of cuts extending approximately to an imaginary line defining said marginal portion of said sheet of material, a first end of each of said straps being attached to said handle by said marginal portion being wrapped about and fastened to said handle adjacent said terminal portion; and
(c) scrubber means fastened to said handle adjacent said terminal portion for exposing, spreading and cooling embers in vegetation.

24. The tool of claim 1 further including a tree planting head, said tree planting head including respective portions of said selectively releasable connector means, and also including a mounting plate and means for attaching a blade to said mounting plate so that said blade is oriented at a predetermined angle with respect to said elongate handle when said tree planting head is attached to said elongate handle by said connection means.

25. The tool of claim 24 wherein said means for attaching a blade to said mounting plate includes threaded fastener means associated with said mounting plate for facilitating removal and replacement of said blade thereon.

26. The tool of claim 23 wherein said scrubber means includes a wire brush.

27. The tool of claim 23 wherein said scrubber means includes a metal collar surrounding said handle and defining a plurality of radially outwardly disposed points.

28. The tool of claim 27 wherein said points are generally triangular and are arranged in rows extending generally diagonally along said metal collar so as to be effective at scrubbing blackline and hiding embers in any and all directions includes a pair of convergent edges defining a respective point.

29. The tool of claim 27 wherein said points are disposed in a plurality of offset rows.

30. A firefighting tool comprising:
(a) an elongate substantially unbreakable and fire resistant handle including means for selectively and removably attaching any of a plurality of different heads thereto, said means for attaching being operable without removal of any small parts from secure attachment to said elongate handle or one of said different heads;

(b) cutting head means attachable to said elongate handle for cutting and severing tree trunks, limbs, and roots, and other woody vegetation;

(c) scraping and throwing head means attachable to said elongate handle for scraping surface materials down to expose mineral soil and for throwing dirt in order to extinguish fire;

(d) a direct contact fire extinguishing head attachable to said elongate handle and including durable fire resistant means for beating flames and fuel to extinguish fire, said fire resistant means including a plurality of elongate flexible straps each having a length of at least about 16 inches;

(e) scrubber means attachable to said elongate handle for pulling apart materials which may hide smoldering embers, in order to tear open, mix, spread, and cool such embers;

(f) rake means large enough to collect fluffy leaves and similar fuels substantially without spilling, in order to remove such fuels from an area in order to separate them from exposure to flames; and (g) staff extension means for assisting a firefighter in walking through difficult terrain.

31. The tool of claim 30 including means for adjusting said scraping and throwing head means to hold a blade thereof at approximately a right angle with respect to said handle, for use of said blade for mixing soil with embers to cool the embers.

32. A scrubber tool for use in extinguishing burning embers, comprising an elongate handle having a terminal portion, a metal collar, and means for holding said collar in a position surrounding said terminal portion, said collar being formed of a single piece of sheet metal and including a generally cylindrical portion including a plurality of cuts defining portions of said piece of sheet metal protruding outwardly as a plurality of radially outwardly disposed points, said points being generally triangular and being arrayed on the metal collar so as to expose a plurality of said points effectively for stirring embers regardless of rotation of said handle, and said means for holding said collar including a pair of ears located on respective opposite margins of said piece of sheet metal and extending generally radially with respect to said generally cylindrical portion and generally parallel with each other, said ears being interconnected with each other by at least one fastener extending therebetween to hold said collar in a desired location with respect to said handle, and said ears defining a further plurality of radially outwardly disposed points for stirring embers.

* * * * *

UNITED STATES PATENT AND TRADEMARK OFFICE
CERTIFICATE OF CORRECTION

PATENT NO. : 5,105,493

DATED : April 21, 1992

INVENTOR(S) : Thomas K. Lugtenaar

It is certified that error appears in the above-identified patent and that said Letters Patent is hereby corrected as shown below:

Col. 2, line 40  Change "fire-fighter" to --firefighter--.

Col. 13, line 61  After "shovel" (first occurrence) insert --head--.

Signed and Sealed this

Tenth Day of August, 1993

Attest:

MICHAEL K. KIRK

*Attesting Officer*        Acting Commissioner of Patents and Trademarks